(12) United States Patent
McNeeney

(10) Patent No.: US 8,977,906 B2
(45) Date of Patent: *Mar. 10, 2015

(54) CHECKPOINT DEBUGGING USING MIRRORED VIRTUAL MACHINES

(75) Inventor: Adam J. McNeeney, Cambridgeshire (GB)

(73) Assignee: International Business Machines Corporation, Armonk, NY (US)

( * ) Notice: Subject to any disclaimer, the term of this patent is extended or adjusted under 35 U.S.C. 154(b) by 118 days.

This patent is subject to a terminal disclaimer.

(21) Appl. No.: 13/621,221

(22) Filed: Sep. 15, 2012

(65) Prior Publication Data

US 2013/0042153 A1 Feb. 14, 2013

Related U.S. Application Data

(63) Continuation of application No. 13/205,739, filed on Aug. 9, 2011, now Pat. No. 8,639,984.

(51) Int. Cl.
*G06F 11/00* (2006.01)
*G06F 11/14* (2006.01)
*G06F 11/36* (2006.01)

(52) U.S. Cl.
CPC .......... *G06F 11/1484* (2013.01); *G06F 11/366* (2013.01); *G06F 11/1438* (2013.01)
USPC ........................................ 714/38.1; 714/6.12

(58) Field of Classification Search
USPC ....................................................... 714/38.1
See application file for complete search history.

(56) References Cited

U.S. PATENT DOCUMENTS

| 6,044,393 | A | 3/2000 | Donaldson et al. |
| 6,112,237 | A | 8/2000 | Donaldson et al. |
| 7,529,897 | B1 | 5/2009 | Waldspurger et al. |
| 7,657,782 | B2 | 2/2010 | Das et al. |
| 8,549,210 | B2 * | 10/2013 | Hunter et al. ...................... 711/6 |
| 8,639,815 | B2 * | 1/2014 | Sherwood et al. ............ 709/226 |
| 8,769,183 | B2 * | 7/2014 | Hunter et al. ...................... 711/6 |
| 2005/0039180 | A1 | 2/2005 | Fultheim et al. |
| 2008/0010496 | A1 | 1/2008 | Das et al. |
| 2009/0070761 | A1 | 3/2009 | Zhao et al. |

(Continued)

OTHER PUBLICATIONS

U.S. Appl. No. 13/205,739 entitled "Checkpoint Debugging Using Mirrored Virtual Machines"; Notice of Allowance dated Sep. 16, 2013 (10 pg.).

(Continued)

*Primary Examiner* — Kamini Patel
(74) *Attorney, Agent, or Firm* — Yudell Isidore PLLC; Thomas E Tyson

(57) ABSTRACT

A computer-implemented method of debugging computer code includes: obtaining state information corresponding to a first machine at a checkpoint initiated during execution of the computer code on the first machine; and configuring the second machine to a same operating state as the first machine at the checkpoint to create a mirrored version of the first machine. The method also includes receiving a notification that execution of the program on a first machine has failed, and in response to receiving the notification: triggering a processor of the second machine to initiate execution of a copy of the code from a specific code execution point at which the checkpoint was; activating a debugger module to run concurrently with the execution of the program on the second machine and collect and store the debug data as corresponding to execution failure of the computer code at the first machine.

11 Claims, 6 Drawing Sheets

(56) References Cited

U.S. PATENT DOCUMENTS

| | | |
|---|---|---|
| 2011/0167298 A1* | 7/2011 | Lee .................................. 714/18 |
| 2012/0191908 A1* | 7/2012 | North et al. ................... 711/112 |
| 2012/0284234 A1 | 11/2012 | Mashtizadeh et al. |
| 2013/0159649 A1* | 6/2013 | Sherwood et al. ............ 711/162 |
| 2013/0311992 A1* | 11/2013 | Fuente et al. ..................... 718/1 |

OTHER PUBLICATIONS

U.S. Appl. No. 13/205,739 entitled "Checkpoint Debugging Using Mirrored Virtual Machines"; Non-final office action dated Apr. 30, 2013 (15 pg.).

\* cited by examiner

CHECKPOINT DEBUGGING USING MIRRORED VIRTUAL MACHINES

PRIORITY CLAIM

The present application is a continuation of and claims priority from U.S. patent application Ser. No. 13/205,739, filed on Aug. 9, 2011, titled "Checkpoint Debugging Using Mirrored Virtual Machines," which is incorporated by reference herein in its entirety and for all purposes.

BACKGROUND

1. Technical Field

The present invention generally relates to data processing systems and in particular to debugging using virtualized data processing systems.

2. Description of the Related Art

A virtual machine (VM) is a logical implementation of a physical machine, such as a data processing system, or a computer system. As such, a VM is capable of executing computer programs and computer readable code in the same way a physical computer system would execute the code and may use resources provided by the physical machine as the resources are made available to the VM. Said another way, the VM provides abstractions of physical resources that are made available to computer programs executing on the VM. A physical machine, such as a computer system, may include a single VM, or may include several VMs. The software layer providing the VM is called a hypervisor.

One method for implementing VMs includes using a mirrored VM environment. In a mirrored VM environment, two identical VMs exist, including identical abstractions of available physical resources. Mirrored virtual machines may reside on a single host, or on separate hosts. The mirrored VM environment allows a computer code that has encountered a hardware error on one virtual machine, to be executed on a second virtual machine.

BRIEF SUMMARY

In general, disclosed is a computer-implemented method of debugging a computer program, including: obtaining state information corresponding to a previous operating state of a first machine at a checkpoint performed during the execution of the computer program on the first machine prior; and configuring, with the state information obtained, a second machine having a same physical configuration to a same operating state as the previous operating state of the first machine at the checkpoint, where the second machine becomes a mirrored version of the first machine relative to execution of the computer code at that checkpoint. The method also includes: receiving a notification indicating that execution of the computer program on a first machine has failed; and in response to receiving the notification, triggering a processor of the second machine to initiate execution of a copy of the compute code on the second machine from a specific code execution point at which the checkpoint was initiated on the first machine. The method also includes activating a debugger module to run concurrently with the execution of the computer program on the second machine and collect debug data corresponding to execution of the computer code on the second machine from the checkpoint up to the failure of the computer code execution on the second machine, and storing the debug data as debug data corresponding to execution failure of the computer code on the first machine.

The above summary contains simplifications, generalizations and omissions of detail and is not intended as a comprehensive description of the claimed subject matter bug, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

Figure 1:
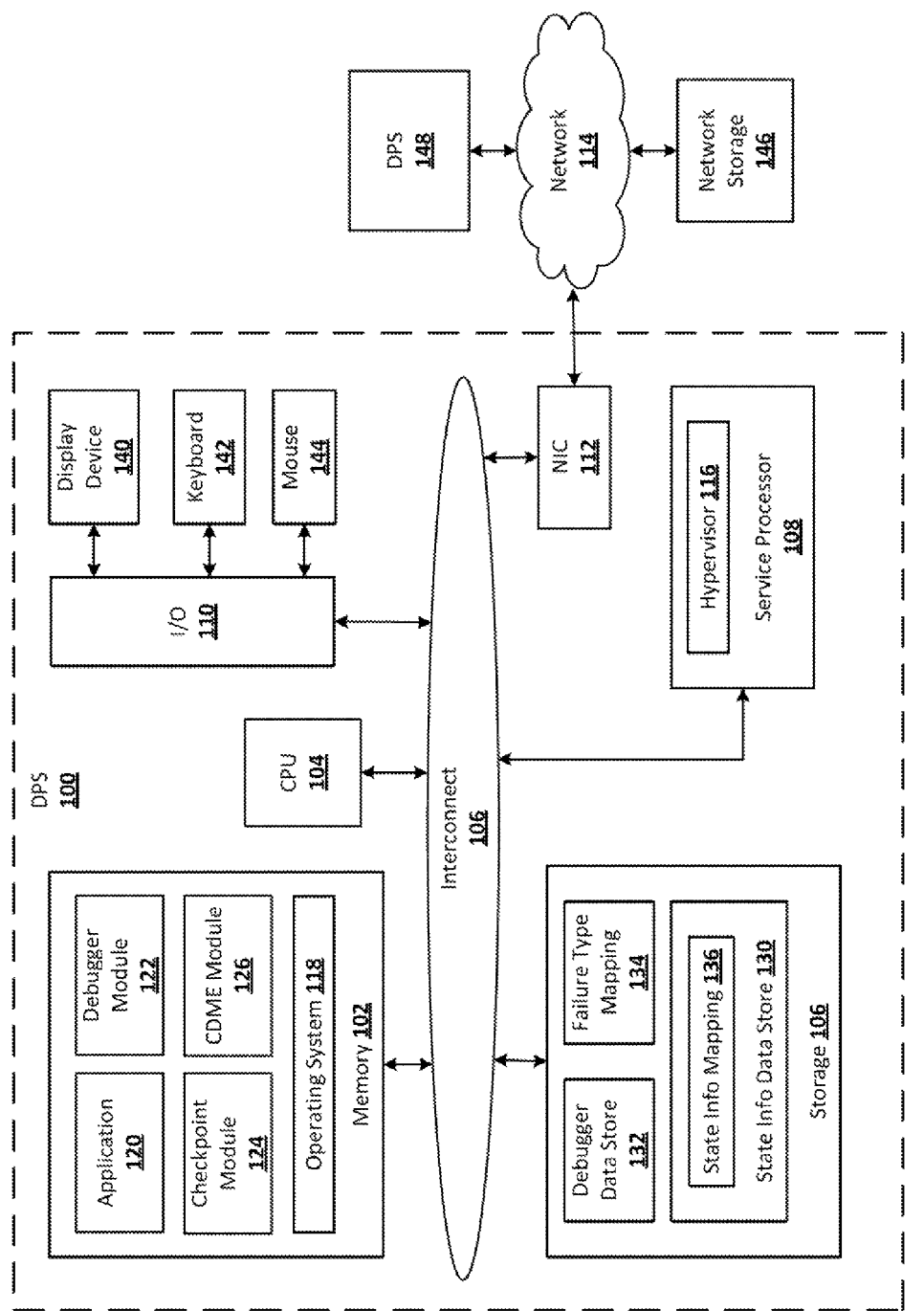
FIG. 1 provides a block diagram representation of an example data processing system within which the invention can be practiced, according to one embodiment.

The illustrative embodiments provide a method, system and computer readable storage medium for checkpoint debugging using mirrored virtual machines. Briefly, embodiments provide a mirrored virtual machine environment for debugging computer code. While the computer code executes on a primary virtual machine, state information is periodically captured at one or more checkpoints and forwarded to a secondary virtual machine. The state information is utilized to configure the secondary virtual machine to mirror the operating state of the primary virtual machine at that checkpoint. In response to a failure occurring in the primary virtual machine or in the execution of the computer code on the primary virtual machine, the secondary virtual machine accesses the previously captured state information, identifies a location in the computer code where the state information was captured (i.e., where the checkpoint occurred), activates a debugging module, and executes the computer code from the identified location in the computer code, while the debugging module collects debug data corresponding to the computer code execution from the identified location.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions (or code). These computer program instructions may be provided to a processor of a general purpose computer, special purpose computer, or other programmable data processing apparatus to produce a machine, such that the instructions, which execute via the processor of the computer or other programmable data processing apparatus, implement the methods/processes/functions/acts specified in the one or more blocks of the flowchart(s) and/or block diagram(s).

These computer program instructions may also be stored in a computer readable medium that can direct a computer, other programmable data processing apparatus, or other devices to function in a particular manner, such that the instructions stored in the computer readable medium produce an article of manufacture (or computer program product) including instructions which implement the method/process/function/act specified in the one or more blocks of the flowchart(s) and/or block diagram(s). The computer program instructions may also be loaded onto a computer, other programmable data processing apparatus, or other devices to cause a series of operational steps to be performed on the computer, other programmable apparatus or other devices to produce a computer implemented process/method, such that the instructions which execute on the computer or other programmable apparatus implement the method/process/functions/acts specified in one or more blocks of the flowchart(s) and/or block diagram(s).

It is understood that the use of specific component, device and/or parameter names (such as those of the executing utility/logic described herein) are for example only and not meant to imply any limitations on the invention. The invention may thus be implemented with different nomenclature/terminology utilized to describe the components/devices/parameters herein, without limitation. Each term utilized herein is to be given its broadest interpretation given the context in which that terms is utilized.

With reference now to the figures, and beginning with FIG. 1, there is depicted a block diagram representation of an example data processing system (DPS) 100, within which the functional aspects of the described embodiments may advantageously be implemented. DPS 100 includes numerous components logically connected by Interconnect 106. Specifically, FIG. 1 depicts DPS 100 including Memory 102, central processing unit (CPU) 104 (also interchangeably referred to as a processor), Storage 106, Service Processor 108, Input/Output (I/O) controller 110, and network interface card (NIC) 112. In addition, FIG. 1 depicts that DPS 100 may be connected via NIC 112 to Network Storage 146 and a second DPS 148 across Network 114.

Those skilled in the art will appreciate that CPU 104 can also be any kind of hardware processor. I/O controller 110 allows a user to interface with DPS 100. As depicted, I/O controller 110 provides an interface for such devices as Display Device 140, Keyboard 142, and Mouse 144. According to one or more embodiments, Display Device 140 may include output means such as a liquid crystal display (LCD), a plasma display, a cathode ray tube (CRT) monitor, or any other kind of display device.

DPS 100 also includes Service Processor 108 that provides a processing engine to support the execution of a hypervisor 116 and the various virtualization services enabled by execution of the hypervisor 116. As described with reference to FIGS. 2-3, hypervisor 116 provisions resources of DPS 100 to create one or more Operating System logical partitions or virtual machines and hypervisor 116 manages the virtual machines and several of the administrative processes associated with the virtual machines.

Memory 102 may be random access memory (RAM), cache memory, flash memory, or any other kind of storage structure that is configured to store computer instructions/code executable by CPU 104 and/or data utilized during such execution. As depicted, Memory 102 includes Operating System 118. Operating System 118 may be any platform that manages the execution of computer code and manages hardware resources. For example, Operating System 118 may be the Advanced Interactive Executive (AIX®) operating system, the LINUX® operating system, or any other operating system known in the art. AIX® is a registered trademark of International Business Machines, and LINUX® is a registered trademark of Linus Torvalds.

Memory 102 also includes Application 120 and a plurality of functional modules, such as Debugger Module 122, Checkpoint Module 124, and Checkpoint Debugging in a Mirrored Environment (CDME) Module 126. It is appreciated that one or more of these modules can be associated with hypervisor 116 and/or can be distributed to specific memory of the one or more virtual machines that can be provisioned by the hypervisor 116. For purposes of clarity of this description, Application 120 is a computer program that comprises executable computer code and which can be debugged, in part, by CDME module 126 and Debugger Module 122. In one or more embodiments, Application 120 may be any computer code that is debugged by CDME module 126 and Debugger Module 122 within a mirrored virtualization environment comprising a first virtual machine and a second virtual machine, which are mirrored virtual machines (see, for example, FIGS. 2 and 3). Within the mirrored virtualization environment, Application 120 is executed by one or more logical partitions (virtual machines) configured by abstracting one or more hardware, firmware and/or OS resources from the components of DPS 100. The logical partitions of DPS 100, or any representation of DPS within the description of the various embodiments, will be interchangeably referred to as virtual machines.

As depicted, DPS 100 also includes Storage 106. Storage 106 may be any kind of computer storage device, such as a hard disk, an optical drive such as a compact disk drive or digital video disk (DVD) drive, and a flash memory drive. Storage 106 includes State Info Data Store 130, Debugger Data Store 132, and an Error Type Mapping 134. State Info Data Store 132 includes one or more sets of state information, which is data collected by Checkpoint Module 124 during execution of Application 120 on a first virtual machine. The operation of Checkpoint Module 124 within the debugging processes provided herein is described in detail below with reference to FIGS. 2-6. In one or more embodiments, State Info Data Store 130 includes State Info Mapping 136 that provides a mapping between each of the one or more sets of stored state information and an associated specific point of execution within the computer code at which the state information is captured.

Debugger Data Store 132 is a portion of Storage 106 where data generated by Debugger Module 122 is stored. According to one or more embodiments, Debugger Data Store 130 includes debug data collected during execution of Application 120, or any computer code executed when the Debugger Module 122 is concurrently executing on the same system as the computer code. Failure Type Mapping 134 includes a mapping between each of a plurality of failure types and one or more of (a) the type of debugging required for the failure type, (b) the state information to utilized to configure the second virtual machine, based on the identified failure type and (c) the specific execution point from which the CDME Module 126 should resume execution of the computer code on the second virtual machine, as explained further in the descriptions which follow. For example, Failure Type Mapping 134 may indicate that when a processor failure occurs, CDME Module 126 should obtain the most recent state information and associated code execution point from a most recent checkpoint, whereas when a memory failure occurs, CDME Module 126 should use older state information and associated "older" code execution point from a previous checkpoint. Although State Info Data Store 130, Debugger Data Store 132, and an Failure Type Mapping 134 is depicted as located in Storage 106, alternative embodiments can be implemented in which any of State Info Data Store 130, Debugger Data Store 132, and Failure Type Mapping 134 may also be stored in Network Storage 146, or in a storage device within DPS 148.

Figure 2:
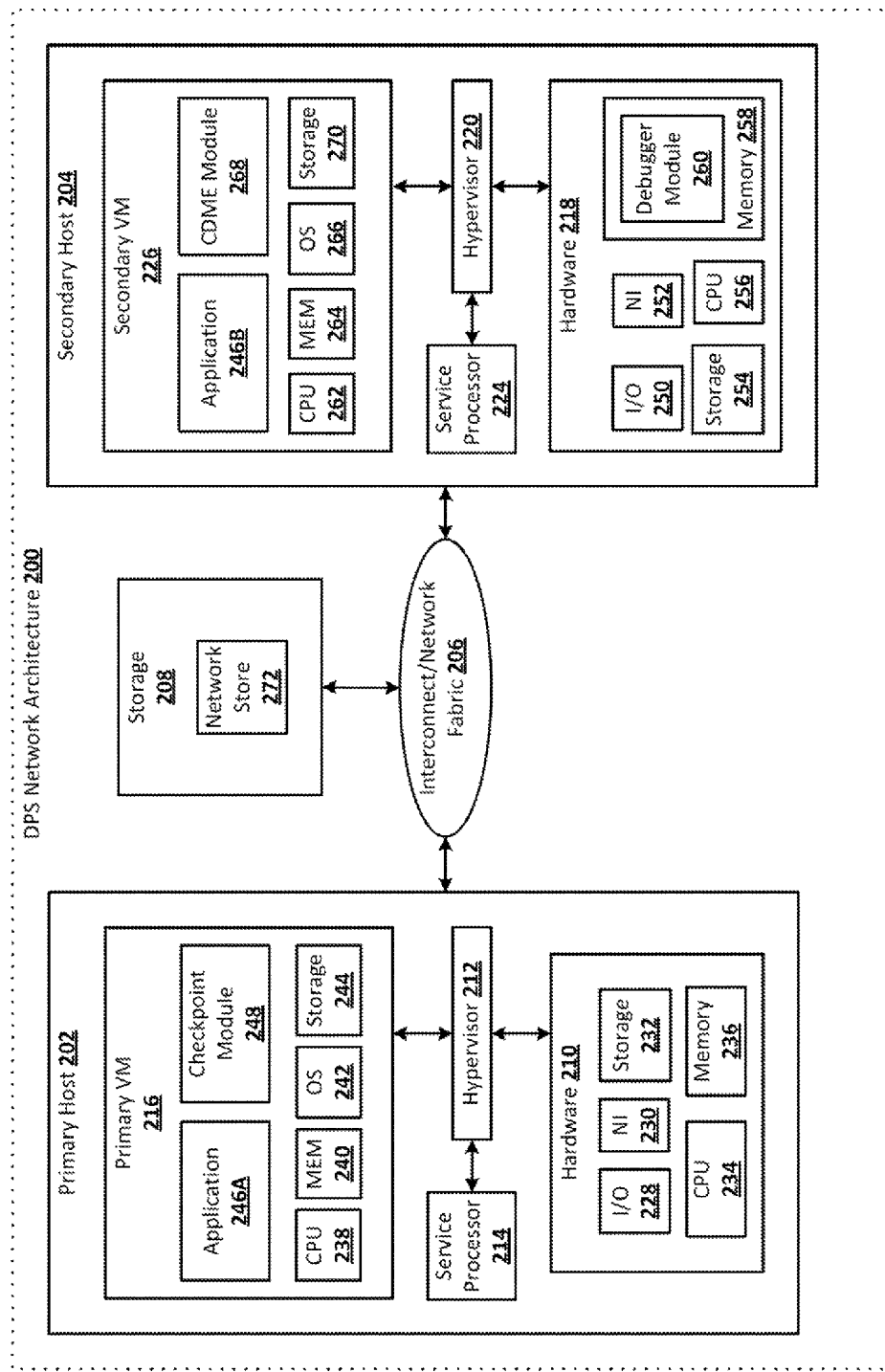
FIG. 2 provides a block diagram representation of an example computing environment with mirrored virtual machines connected within a network architecture, according to one embodiment.

With reference now to FIG. 2, there is illustrated an example virtualized Networked DPS Architecture 200 having mirrored virtual machines in separate host devices interconnected via a network architecture (206), according to one or more of the described embodiments. Networked DPS Architecture 200 serves as an example of the mirrored VM environment with the primary and secondary VMs located on different host devices distributed across a network.

As depicted, Networked DPS Architecture 200 includes Primary Host 202 and Secondary Host 204 communicatively connected across an interconnect or a Network Fabric 206. In addition, the Networked DPS Architecture 200 includes Storage 208 connected on the Network Fabric 206. According to one or more embodiments, each of the Primary Host 202 and Secondary Host 204 is a physical computer system. Similar to DPS 100 in FIG. 1, Primary Host 202 includes Hardware 210 including I/O 228, Network Interface (NI) 230, local Storage 232, CPU 234, and Memory 236. Similarly, Secondary Host 204 includes separate Hardware 218 including I/O 250, NI 252, Storage 254, CPU 256, and Memory 258. Components found in Hardware 210 and Hardware 238 can be similar to components found in DPS 100 of FIG. 1.

In Primary Host 202, Hypervisor 212 is logically located above Hardware layer 210. Hypervisor 212 is a virtualization management component that partitions resources available in Hardware 210 to create logical partitions, such as Primary VM 216. In addition, Hypervisor 212 is configured to manage Primary VM 216 and the system resources made available to Primary VM 216. Hypervisor 212 is operatively connected to Service Processor 214 (and/or may execute within/on service processor 214), which allows for external configuration and/or management of the logical partitions via Hypervisor 212.

As illustrated, Primary VM 216 includes CPU 238, which is a logical partition of CPU 234, and Memory 240, which is a logical partition of Memory 236. Primary VM 216 can also have access to logical partitions of Storage 232 that provides local storage 244 for Primary VM 216. In addition, Primary VM 216 includes an instance of Operating System 242. Primary VM 216, and the logical components therein, provide a virtual execution environment for computer code. Specifically, as depicted, Primary VM 216 can be an execution environment to execute Application 246A, and Checkpoint Module 248. In an alternate embodiment, Checkpoint Module 248 can exist as an executable module within hypervisor 212 and execution of Checkpoint Module 248 can be periodically triggered by hypervisor 212. In yet another embodiment, Checkpoint Module 248 can be an executable module within OS 242.

Checkpoint Module 248 is a utility that can run concurrently during execution of Application 246A to periodically obtain state information. When executed, Checkpoint Module 248 monitors a concurrently executing program for checkpoints. In one of more embodiments, checkpoints are points in execution of a computer program at which state information should be captured. Checkpoints may be provided by Application 246A. Alternatively, Checkpoint Module 248 may cause checkpoints to be encountered during execution of Application 246A. When a checkpoint is encountered, Checkpoint Module 248 causes execution of Application 246A to be suspended by CPU 238, the processor executing Application 246A. Checkpoint Module 248 captures state information corresponding to the point in execution where execution has been suspended. In one or more embodiments, state information includes data such as a processor state, or memory pages that have been modified since the previous checkpoint or since execution of Application 246 was initiated. Checkpoint Module 248 transmits captured state information to a storage device, causes execution of Application 246A to restart from the point of execution where execution was suspended, and continues to monitor execution of Application 246A to identify when a checkpoint has been encountered.

In Secondary Host 204, Hypervisor 220 is logically located above Hardware layer 218. Hypervisor 220 is a virtualization management component that partitions resources available in Hardware 218 to create logical partitions, such as Secondary VM 226. In addition, Hypervisor 220 is configured to manage Secondary VM 226 and the system resources made available to Secondary VM 226. Hypervisor 220 is operatively connected to Service Processor 224 (and/or may execute within/on service processor 214), which allows for external configuration and/or management of the logical partitions via Hypervisor 220.

Within the mirrored virtual environment of Networked DPS architecture 200, Hypervisors 212 and 220 communicate with each other during set up of the primary VM 216 and secondary VM 226 to ensure that the two mirrored VMs are similarly/identically configured from a hardware and software standpoint. From the overall system perspective, each hypervisor allocates an exact amount of resources to its respective virtual machine and also ensures that the type of resource being allocated is similar. For example, the processor speeds of the allocated processor resources are the same, the type of read only memory and of random access memory provisioned are the same (same speed of access and physical configuration), etc. A similar version of the OS instance is also allocated to each of the virtual machines. Similar loading of executable work is also provided for both systems, although only the primary VM 216 actually executes its workload on an ongoing basis. Thus, both primary VM 216 and Secondary VM 226 are provided with an identical copy of Application, identified as Application 246A and Application 246B, respectively. The secondary VM 226 serves as a backup VM and specifically as a debug VM that operates primarily to perform debugging of any failure condition that occurs at the primary VM 216. Thus, computer code (of Application 246B, for example) execution at the secondary VM 226 can be limited to only execution of computer code from a specific code execution point corresponding to a checkpoint from which debugging of the computer code is to occur, following (or in response to) an execution failure of the computer code in the primary VM 216.

In order to efficiently failover to the secondary VM 226 in the event of an execution failure of the computer code of the primary VM 216, one embodiment provides that secondary VM 226 is automatically configured to the current operating state of the primary VM 216 at each checkpoint. Thus, Hypervisor 220 receives/obtains the state information from the primary VM 216 at a first checkpoint, and Hypervisor 220 immediately configures secondary VM 226 to the same operating state as identified by the received state information. Once the configuration of secondary VM 226 successfully completes, Hypervisor 220 then notifies Hypervisor 216, and Hypervisor 216 initiates the resumption of the code execution on primary VM 216. With this mirroring of the virtual machines at each checkpoint, the debugging of the Application at the secondary VM 226 can occur from the last checkpoint without the delay of having to configure the secondary VM to the correct operating state in response to the failure condition. However, given the likelihood that the debug data required to analyze the failure condition could span back over several checkpoints, an alternate embodiment, which is described herein, allows the hypervisor 220 to configure the secondary VM 226 to any one of multiple operating states corresponding to one of multiple previous checkpoints encountered. With this embodiment, the operating states for each checkpoint are stored within local storage 270 of secondary VM 226 or some other accessible storage. Selection of the specific checkpoint to which to roll back the secondary VM 226 to complete debugging of the failure condition is then performed by CDME Module 268 and/or Hypervisor 220 based on information received along with the failure notification, including, but not limited to, the failure type information. The embodiments described herein assume the checkpoint can be selected based on the information received, although implementations in which the most recent checkpoint serves as the sole checkpoint and/or the default checkpoint for selection (where no additional information accompanies the failure notification) all fall within the scope of the described embodiments.

Secondary VM 226 includes CPU 262, which is a logical partition of CPU 256, and Memory 264, which is a logical partition of Memory 258. Secondary VM 226 can also have access to logical partitions of Storage 254 that provides local storage 272 for Secondary VM 226. In addition, Secondary VM 216 includes an instance of Operating System 266. Primary VM 216 and Secondary VM 226 are mirrored virtual machines. Thus, Secondary VM 226, and the logical components therein, provide a virtual execution environment for computer code that is equivalent to the virtual execution environment of Primary VM 216. As depicted, Secondary VM 226 can be an execution environment to execute Application 246, CDME Module 268, and Debugger Module 260 (illustrated within system level Memory 258). In an alternate embodiment, CDME Module 268 and Debugger Module 260 may be provided as part of Hypervisor 220 and can exist as executable modules within hypervisor 212, and execution of one or both CDME Module 268 and Debugger Module 260 can be triggered by Hypervisor 220 following receipt of notification of a failure condition detected in the execution of the computer code (e.g., Application 246A) on the Primary VM 216. In yet another embodiment, CDME Module 268 and/or Debugger Module 260 can be an executable module within OS 266.

In an alternate embodiment, one or both of CDME 248 module and Debugger Module can be provided as services within service processor 224 operating in conjunction with Hypervisor 220.

CDME Module 268 is a utility that interfaces with Debugger Module 260, and activate/trigger checkpoint debugging in a mirrored virtual environment from the perspective of the Secondary VM 226. In one or more embodiment, CDME Module 268 facilitates debugging of Application 246 in response to a failed execution of Application 246A in a first virtual machine, Primary VM 216. If an execution failure occurs during execution of Application 246A by the first virtual machine, CDME Module 268 receives a notification that an execution failure has occurred. CDME Module 268 obtains state information previously captured and stored by Checkpoint Module 248. CDME Module 268 configures CPU 262 (e.g., CPU registers, buffers, etc) and memory 264 (e.g., memory pages and data present within cache resources) in the second virtual machine, Secondary VM 226 to an operational state that corresponds to the operational state of the first virtual machine at the selected checkpoint. CDME Module 268 also activates Debugger Module 260 and triggers CPU 262 to "resume" or initiate execution of Application 246B (i.e., an exact copy of Application 246A) at the specific execution point corresponding to the checkpoint. CDME Module 268 and/or hypervisor 220 also activates Debugger Module 260 in the second virtual machine to run concurrently with the execution of the Application 246B from the specific code execution point up to the point at which the failure condition is encountered within the executing computer code.

Debugger Module 260 is a utility that can, but does not always, run concurrently during execution of Application 246B on Secondary VM 226 to capture debug data associated with the Application 246B. In one or more embodiments, Debugger Module 260 captures data related to execution of Application 246, such as execution events or changes in variables. Debugger Module 260 can also transmit to and/or store debugger data into a storage device. In one or more embodiments, Debugger Module 260 is only executed from the specific execution point corresponding to a selected checkpoint at which state information being utilized to configure the secondary VM 226 was obtained. This limited use of the Debugger Module 260 decreases the amount of debug data generated, pinpoints the specific code location associated with the detected execution failure, and reduces the amount of resources, including power, required to run the Debugger Module 260, thus enabling more efficient execution of the Application and more efficient use of system resources, among other benefits.

In one or more embodiments, Checkpoint Module 248 stores a plurality of sets of state information obtained from a plurality of previous checkpoints instituted on the several points of execution. In addition, the type of error encountered may determine which state information CDME Module 268 obtains. In one or more embodiments, the type of error may be identified by a type of notification received by CDME Module 268.

In one or more embodiments, Checkpoint Module 248 executes concurrently with Application 246A on CPU 238 to periodically obtain state information for resources in Primary VM 216. When a checkpoint is encountered, Checkpoint Module 248 causes execution of Application 246A to be suspended by CPU 238. Checkpoint Module 248 captures state information of the primary VM 216 corresponding to the specific point in execution where execution of the computer code has been suspended. In one embodiment, the captured state information comprises one or more of a processor state and memory pages that have been modified since the previous checkpoint or since execution of Application 246A was initiated. Checkpoint Module 248 transmits captured state information to a State Info Data Store on storage device (e.g., Storage 232), which is a pre-established storage location for storing the checkpoint data. Included within the stored state information is a code execution point that identifies where the checkpoint occurred during execution of the computer code. Other parameters can also be included along with the stored state information to allow for later determination (by a CDME Module 268) of a correct checkpoint and corresponding set of state information from which to initiate debugging on the Secondary VM 226, based on the type of failure that may be encountered during execution of Application 246A. In response to successful completion of the storage of the state information at the pre-established storage location, Checkpoint Module 248 causes CPU 238 to restart/resume execution of Application 246A from the specific code execution point where execution was suspended. The pre-established storage location can be any storage location that is accessible to the Secondary VM 226 and/or CDME Module 268, and is configured by the hypervisor and/or OS setting up the mirroring environment for debugging execution failure of the Primary VM 216.

Debugger Data Store, State Info Data Store, and Failure Type Mapping (illustrated within FIG. 1) represent data blocks that can be respectively located within one or more of Storage 232 in Primary Host 202, Storage 254 in Secondary Host 204, local storage 270 in Secondary Host, and/or Network Store 272, and which can be distributed or copied within multiple storage devices in Networked DPS Architecture 200.

When an execution failure occurs in Primary VM 216, a notification is generated by one or more of Checkpoint Module 248, OS 242, and hypervisor 212 (depending on the implementation level provided for failure detection on the primary VM 216). The notification is communicated to the hypervisor 220 of the Secondary VM 226 and ultimately received by CDME Module 268 on Secondary VM 226. CDME Module 268 selects a previous checkpoint and obtains, from the pre-established storage location, state information previously captured and stored by Checkpoint Module 248 at that checkpoint. CDME Module 268 and/or hypervisor 220 configures Secondary VM 226 to a same physical configuration as Primary VM and sets the operational state of Secondary VM 226 to that of the Primary VM when the checkpoint was initiated at the Primary VM. Thus, CMDE Module 268 causes CPU 262 and Memory 264 in Secondary VM 226 to have operational states corresponding to the state information obtained relative to the selected checkpoint. CDME Module 268 (and/or hypervisor 220) also activates Debugger Module 260 before initiating execution by the CPU 262 of computer code of Application 246B from the specific code execution point. Application 246B thus executes with Debugger Module 260 concurrently executing in the background in Secondary VM 226 from the specific code execution point at which state information was previously captured. Thus, Debugger Module 260 captures debug data corresponding to the execution of computer code of Application 246 using an identical virtual execution environment as the one in which the execution failure originally occurred. Debugger Module 260 stores debug data in a Debugger Data Store, which may be located locally within Storage 254, or in Network Store 270. The debug data can then be made available to an administrator for evaluation of the failure and/or computer code segment that caused the failure.

Figure 3:
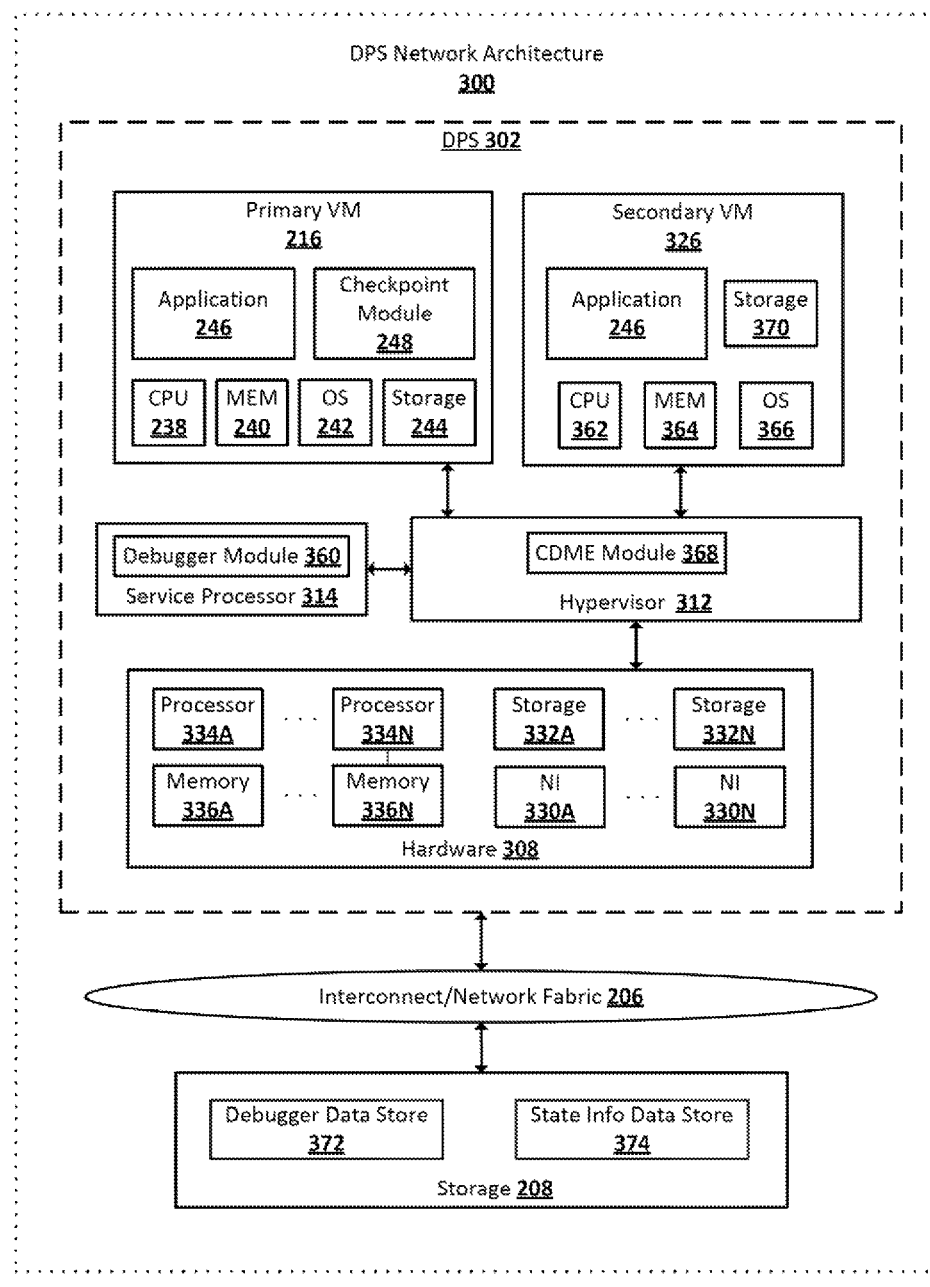
FIG. 3 provides a block diagram representation of an example computing environment having mirrored virtual machines collocated on the same physical host, according to one embodiment.

With reference now to FIG. 3, there is presented a single host device implementation of an example virtualized DPS architecture 300, within which the functional aspects of the described embodiments may advantageously be implemented. Virtualized DPS Architecture 300 comprises a virtualized DPS 302 that serves as an example of a mirrored VM environment within a single physical device. Virtualized DPS 302 is presented as a server that comprises hardware components 308 and software/firmware/OS components that are logically partitioned and provisioned by a hypervisor 312 to create Primary VM 324 and Secondary VM 326. DPS 302 can be operatively connected to distributed/remote Storage 208 over Interconnect/Network Fabric 206.

The architecture of DPS 302 is similar to that of FIG. 1 with the virtualized machines individually illustrated. Within this alternate embodiment, the Hardware layer 308 includes a plurality of each of Processor 334A-334N, Storage 332A-332N, Memory 336A-336N, and network adapters or interfaces (NI) 330A-330N. Hypervisor 312 and Service Processor 314 are logically located above Hardware layer 308. As shown, FIG. 3 exemplifies one or more embodiments where Debugger Module 360 is located within Service Processor 314, and where CDME Module 368 is located within Hypervisor 312. As with FIG. 2, Hypervisor 220 partitions resources available in Hardware 218 to create logical partitions, including both Primary VM 216 and Secondary VM 326, which are collocated on the same physical device. In addition, Hypervisor 220 is configured to manage both Primary VM 216 and Secondary VM 326 and the system resources made available to Primary VM 216 and Secondary VM 326. Hypervisor 312 further supports all communication between Primary VM 216 and Secondary VM 326, particularly the exchange of information related to checkpoint debugging, as presented herein.

Secondary VM 326 includes CPU 362, which is a logical partition of processor resources selected from one or more of Processor 334A-334N, Memory 364, which is a logical partition of memory resources from one or more of Memory 336A-336N, and local storage 370, which is a logical partition of Storage 332A-332N. Similarly, in FIG. 3, CPU 238, Memory 240, and local storage 244 of Primary VM 216 are also logical partitions of available processor resources, Processor 334A-334N, memory resources, Memory 336A-336N, and Storage 332A-332N, respectively. As with FIG. 2, both Primary VM 216 and Secondary VM 326 are configured as similar/identical virtual machines, referred to herein as mirrored virtual machines.

Those of ordinary skill in the art will appreciate that the hardware components and basic configuration depicted in FIGS. 1-3 may vary. The illustrative components within DPS are not intended to be exhaustive, but rather are representative to highlight essential components that are utilized to implement the present invention. For example, other devices/components may be used in addition to or in place of the hardware depicted. The depicted example is not meant to imply architectural or other limitations with respect to the presently described embodiments and/or the general invention. The data processing systems depicted in FIGS. 1-3 may be, for example, an IBM eServer pSeries system, a product of International Business Machines Corporation in Armonk, N.Y., running the AIX operating system or LINUX operating system.

Figure 4:
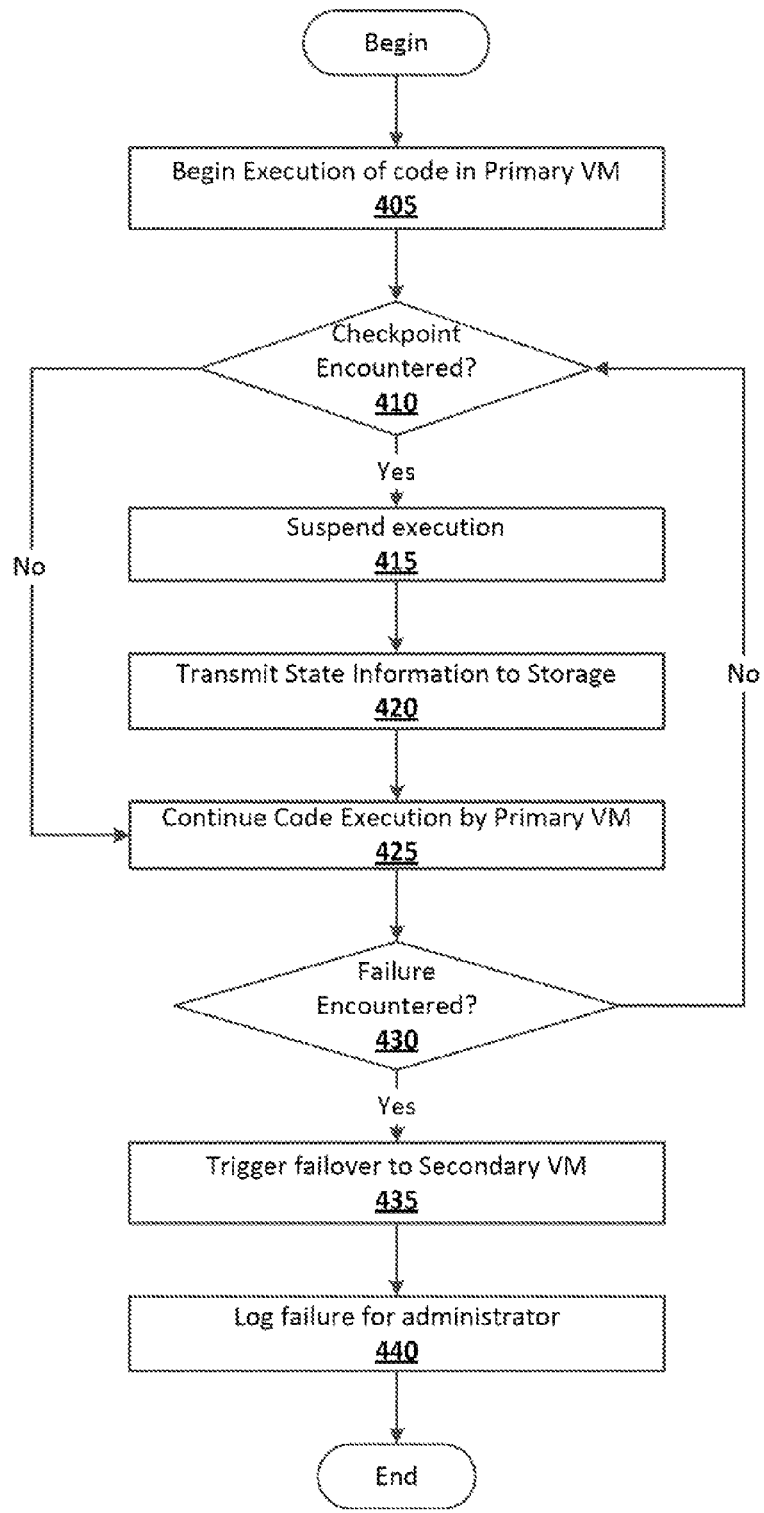
FIG. 4 is a flow chart illustrating the processes within the method for collecting state information during checkpoint operations and notifying of a failure occurring within execution of a computer code on a first virtual machine, according to one embodiment.

FIG. 4 illustrates a flow chart illustrating a computer-implemented method for capturing and storing state information, according to one embodiment. Specifically, FIG. 4 illustrates a method for capturing, on a first machine, state information that can be utilized for debugging a computer code of a computer program or Application within a mirrored virtual environment having a primary and a secondary virtual machine. As described above, the primary and secondary virtual machine may be located on separate physical devices, or they may be located on a single device, and references are made to components presented within both the FIGS. 2 and 3 architecture. One or more processes within the method can be completed by the CPU 238 of a primary VM 216 executing Checkpoint Module 248 or alternatively by service processor 214/314 executing Checkpoint Module 248 as a code segment of hypervisor 212/312 and/or the OS 242. To ensure coverage for these alternate embodiments, the method will be described from the perspective of the Checkpoint Module 248 and the functional processes completed by the Checkpoint Module 248, without limiting the scope of the invention.

The method begins at block 405, where the primary virtual machine begins execution of computer code. For simplicity, the following description assumes that the execution of the computer code occurs after the set up and configuration of the mirrored virtual machines to avoid lag time with completing a debugging process that may later be required. At decision block 410, the checkpoint module determines whether a checkpoint has been encountered within the code execution. In this scenario, the checkpoint is actually one that is pre-programmed within the instruction code to occur at specific points in the code's execution. In one or more alternate embodiments, the checkpoint can be triggered by the checkpoint module to cause the hypervisor to pause the processor execution within the primary virtual machine at a specific time (based on some pre-set periodicity). Rather than encountering a checkpoint, the checkpoint module can thus be said to generate the checkpoint. If a checkpoint is not encountered, then the method continues at block 425 and the primary virtual machine continues to execute the computer code.

Returning to decision block 410, if a checkpoint is encountered, then the flowchart continues at block 415, at which the checkpoint module causes the hypervisor to suspend execution of the computer code in the primary virtual machine. Then, at block 420, the checkpoint module captures current state information, including the code execution point associated with the checkpoint, and transmits the state information to a storage device established during the set up of the mirrored virtual machines as the location for storing checkpoint-related state information. As described above, state information may include such data as a processor state, the state of memory pages, the state of peripheral hardware, or any other data regarding the state of any of the primary hardware, at an execution point in the computer code at which the checkpoint occurs in the primary virtual machine. As described above, the state information can be stored in a computer readable storage device either locally, or across a network. At block 425, the checkpoint module causes the hypervisor to resume execution of the computer code in the primary virtual machine, in response to successful completion of storage of the state information. Notably, the stored state information includes and/or is associated or tagged with the specific code execution point as well as a unique identifier of the checkpoint to enable granular access to the state information based on a selected checkpoint at a later time.

At decision block 430, the checkpoint module or hypervisor determines whether an execution failure is encountered. If a failure is not encountered, the method continues at decision block 410, and the checkpoint module determines again made whether a checkpoint is encountered. Those skilled in the art will appreciate that blocks 410, 425, and 430 indicate that execution of the computer code continues in the primary virtual machine until either a checkpoint or a failure is encountered.

Returning to block 430, in the event that an execution failure is encountered, the method continues at block 435, where the execution failure in the primary virtual machine causes the primary virtual machine to trigger a failover to the secondary virtual machine. According to one or more embodiments of the invention, the failover trigger may be in the form of a message passed from the primary virtual machine to the CDME module, or any indication received by the CDME module indicating that a software failure has occurred in the primary virtual machine. At block 440, the execution failure is logged for an administrator.

Figure 5:
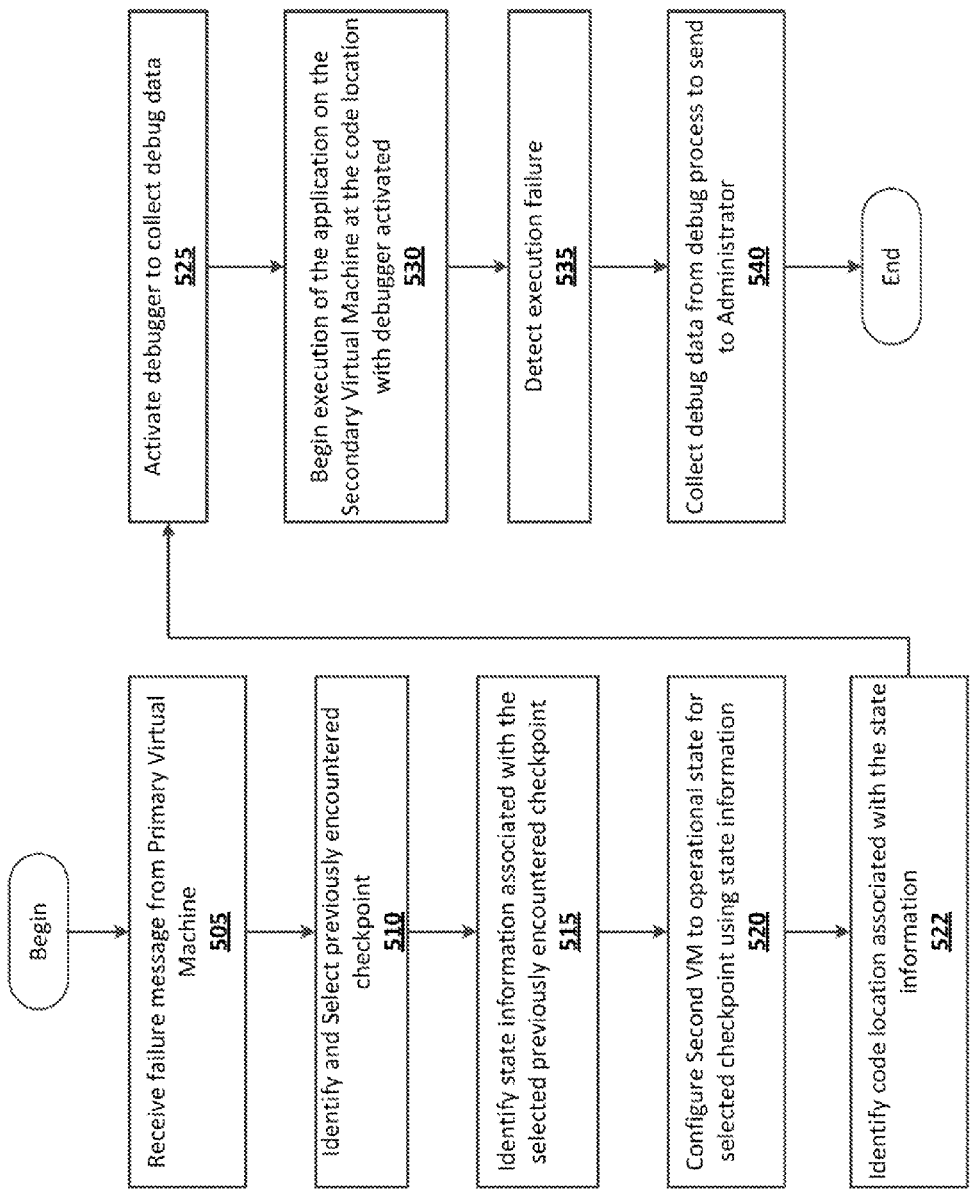
FIG. 5 is a flow chart illustrating the processes within the method for checkpoint-based debugging of computer code using mirrored virtual machines, according to one embodiment.

FIG. 5 illustrates a flow chart illustrating the debugging processes at the secondary virtual machine within the method for checkpoint debugging using mirrored virtual machines, according to one embodiment. Specifically, FIG. 5 illustrates a method for debugging computer code of a computer program, such as an application, using a mirrored virtual environment comprised of mirrored primary and secondary virtual machines. Aspects of the method are described from the perspective of the secondary virtual machine, and particularly components within the secondary virtual machine. One or more processes within the method can be completed by the CPU 262/362 of a secondary VM 226/326 that is executing CDME Module 268/368 or alternatively by service processor 224/314 executing CDME Module 268/368 as a module within Hypervisor 212/312 and/or within the OS 266/366. To ensure coverage for these alternate embodiments, the method will be described from the perspective of CDME Module 268/368 and the functional processes completed by CDME Module 268/368, without limiting the scope of the invention.

The method begins at block 505, where the CDME Module receives a failure message from the primary virtual machine via the hypervisor(s). In addition, as described above, the failure message may indicate a type of execution failure that was encountered in the primary virtual machine, which could trigger a specific one of multiple different debugging modes of the debugger module and/or a selected checkpoint from among multiple previous checkpoints to utilized in configuring the operational state of the secondary VM 226/326, in one or more embodiments. The CDME Module may parse the notification to obtain the failure type from among several pre-established failure types.

At block 510, the CDME Module identifies and selects a previously encountered checkpoint. According to one or more embodiments, the previously encountered checkpoint may be the most recent checkpoint at which state information was successfully captured, or another earlier checkpoint that can be selected based on the execution failure type identified by the failure notification message. In one or more embodiments, the checkpoint is selected based on the failure type. At block 515, the CDME Module obtains stored state information associated with the selected, previously encountered checkpoint. The CDME Module configures the secondary virtual machine to operate similarly to the primary virtual machine at the identified checkpoint, at block 520. At block 522, the CDME Module identifies an execution point in the computer code corresponding to the selected checkpoint and identified state information. At block 525, the CDME Module activates a Debugger Module to begin collecting debug data from execution of the Application on the secondary virtual machine from the selected checkpoint.

At block 530, the secondary virtual machine begins execution of the computer code at the location in the computer code identified in block 522. Execution continues with the debugger activated, such that the debugger concurrently collects debug data corresponding to execution of the computer code in the secondary virtual machine. At block 535 the computer code encounters the same execution failure in the secondary virtual machine as was encountered in decision block 430 in FIG. 4. This occurs because the primary virtual machine and secondary virtual machine are mirrored virtual machines. At block 540, the CDME Module collects debug data from the debugger to send to an administrator. The debug data can also be stored for later access by the administrator.

In each of the flow charts above, one or more of the methods may be embodied in a computer readable storage medium containing computer readable code such that a series of actions are performed when the computer readable code is executed by a processor on a computing device. In some implementations, certain actions of the methods are combined, performed simultaneously or in a different order, or perhaps omitted, without deviating from the spirit and scope of the invention. Thus, while the methods are described and illustrated in a particular sequence, use of a specific sequence of actions is not meant to imply any limitations on the invention. Changes may be made with regards to the sequence of actions without departing from the spirit or scope of the present invention. Use of a particular sequence is therefore, not to be taken in a limiting sense, and the scope of the present invention is defined only by the appended claims.

Figure 6:
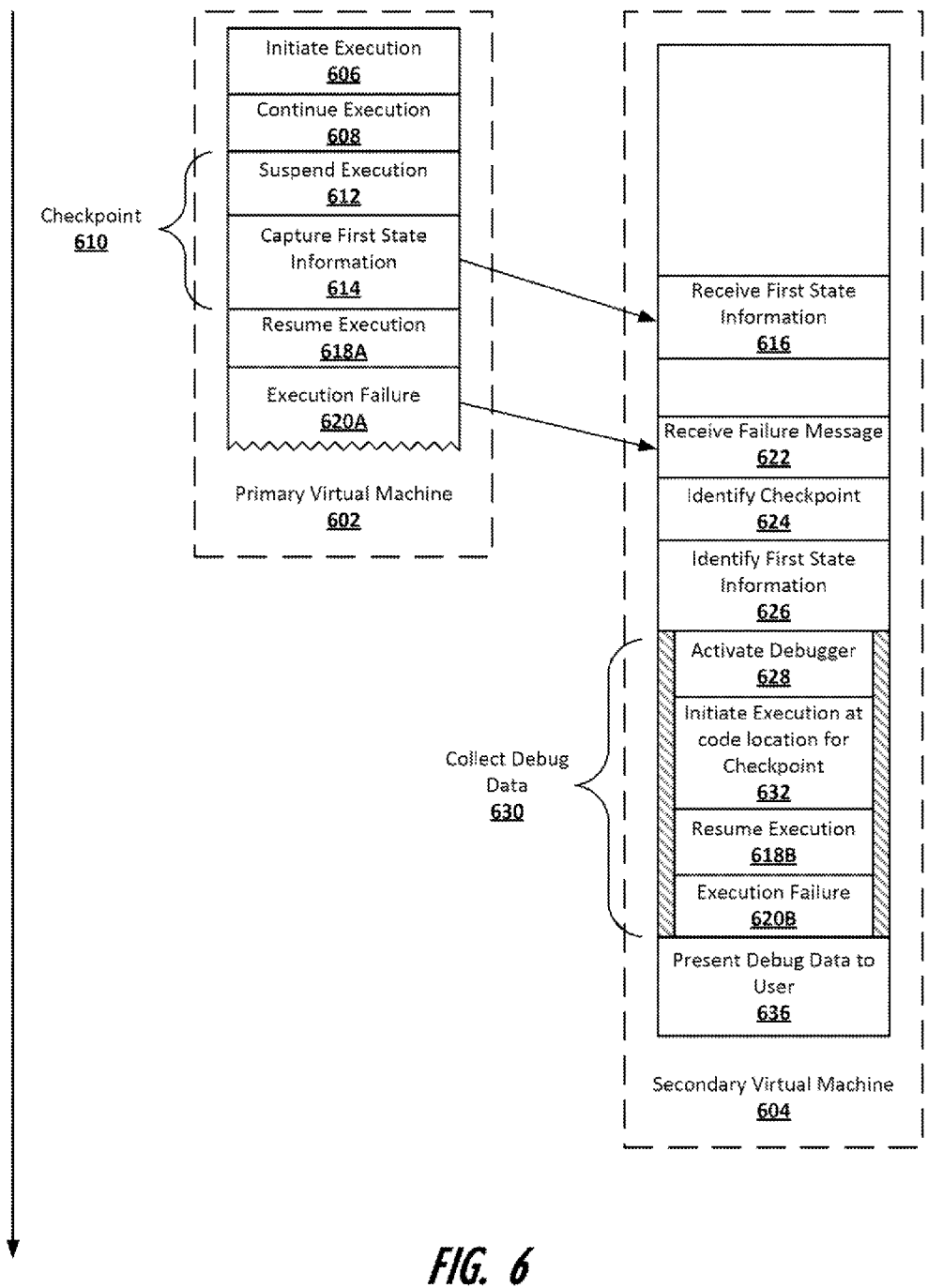
FIG. 6 is an example sequence diagram of the method for checkpoint debugging using mirrored virtual machines, according to one embodiment.

FIG. 6 illustrates an example flow diagram according to one or more embodiments. Specifically, FIG. 6 shows the execution state of Primary Virtual Machine 602 and Secondary Virtual Machine 604 at different times along a sequential vertical timeline. Those skilled in the art will appreciate that FIG. 6 is provided for exemplary purposes only and is not intended to be construed as limiting the scope of the described embodiments.

The flow diagram begins at 606, where processor execution of computer code of a computer program is initiated in Primary Virtual Machine 602. Primary Virtual Machine 602 continues to execute the computer program at 608 until Checkpoint 610 is encountered. Checkpoint 610 includes a plurality of distinct actions, of which three are illustrated. At 612 execution of the computer program is suspended. Then at 614, first state information is captured. At 616, the first state information is transferred to the Secondary Virtual Machine 604 or, in an alternate embodiment, to a pre-established storage location, from which and the first state information is ultimately received by the CDME Module of the Secondary Virtual Machine 604.

Once notification is received that the first state information has been successfully transmitted to (or received by) the Secondary Virtual Machine, Primary Virtual Machine 602 resumes execution of the computer program at 618A, until an execution failure is encountered at 620A. The execution failure at 620A causes Secondary Virtual Machine 604 to receive a failure message at 622. At 624, Secondary Virtual Machine 604 identifies that Checkpoint 610 is the previous checkpoint to be used for debugging purposes. Then, at 626, Secondary Virtual Machine 604 identifies first state information associated with Checkpoint 610, and in particular the code execution point corresponding to the checkpoint.

At 628, Secondary Virtual Machine 604 activates the debugger to begin capturing debug data, as depicted by 630. At 632, Secondary Virtual Machine 604 concurrently initiates execution of the computer program from the location in the computer code associated with Checkpoint 610, as determined when code execution was suspended in Primary Virtual Machine 602. Because Primary Virtual Machine 602 and Secondary Virtual Machine 604 are mirrored virtual machines, when execution is resumed at 618B on Secondary Virtual Machine 604, execution of the computer code at 618B will be identical to the execution of the computer code at 618A on Primary Virtual Machine 602. Further, at 620B, Secondary Virtual Machine 604 will encounter the same execution failure that was encountered at 620A in Primary Virtual Machine 602.

As depicted, the Debugger Module captures debug data at 630. The debug data is collected during execution of the segments of code beginning from the execution point corresponding to the selected checkpoint up to at least the point of execution failure at 634. The debug data is then stored and or made available to a system administrator at 636. According to one or more embodiments of the invention, the debug data can be presented in a way to allow a user to determine a cause of the execution failures at 620A and 620B.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code (or instructions) embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, R.F, etc., or any suitable combination of the foregoing. Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a computer program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A computer-implemented method of debugging computer code executing on a first machine, the method comprising:

obtaining state information corresponding to a previous operating state of the first machine at a checkpoint performed during the execution of the computer code on the first machine;

configuring, with the state information obtained, a second machine having a same physical configuration to a same operating state as the previous operating state of the first machine at the checkpoint, wherein the second machine is a mirrored version of the first machine relative to execution of the computer code;

receiving a notification that execution of the computer code on the first machine has failed; and in response to receiving the notification:

triggering a processor of the second machine to initiate execution of a copy of the computer code on the second machine from a specific code execution point at which the checkpoint was initiated on the first machine;

activating a debugger module to run concurrently with the execution of the copy of the computer code on the second machine and collect debug data corresponding to execution of the computer code on the second machine from the checkpoint up to the failure of the computer code execution on the second machine; and storing the debug data as debug data corresponding to execution failure of the computer code on the first machine.

2. The method of claim 1, wherein:

the first machine and the second machine are a first virtual machine and a second virtual machine, each respectively configured and maintained by a hypervisor and each having an identical provisioning of an amount and type of processor, memory and other resources to enable the first virtual machine and the second virtual machine to respectively perform an identical execution of the computer code and of the copy of the computer code;

the computer code executes in the first virtual machine with no concurrent execution of a debugger to enable more efficient execution of the computer code and to reduce an amount of processor and other resources utilized while running the computer code on the first machine; and the copy of the computer code is executed concurrently with the debugger module on the second machine from only the specific code execution point at which the checkpoint was initiated and only in response to detection of the execution failure of the computer code at the first machine.

3. The method of claim 1, wherein obtaining the state information corresponding to a previously initiated checkpoint comprises:

accessing a pre-established storage location at which the state information is stored during the checkpoint on the first machine, wherein the state information is stored at the pre-established storage location by a checkpoint module performing the checkpoint on the first machine, wherein the checkpoint module completes the processes of: suspending execution of the computer code in the first machine; capturing current state information of the first machine, including the specific point of execution in the computer code; storing the state information at the pre-established storage location that is accessible to the second machine; and resuming execution of the computer code on the first machine in response to successful completion of the storing of the state information.

4. The method of claim 1, wherein:

the state information comprises information and data corresponding to at least a processor state and a memory state existing within the first machine at the checkpoint and is linked to the specific code execution point corresponding to the checkpoint; and obtaining the state information comprises retrieving the processor state, memory state and associated specific code execution point from the accessible storage.

5. The method of claim 1, further comprising:

parsing the notification for an indication of a failure type from among one or more pre-established failure types having associated failure characteristics and debug requirements;

selecting, based on the failure type indicated within the notification, the state information corresponding to a selected checkpoint from among a plurality of previous checkpoints performed at different times on the first machine, with each of the plurality of previous checkpoints having a different set of state information and a different specific code execution point, wherein the selected checkpoint enables complete debugging of the failure type; and running the debugger module from the selected checkpoint with one or more available debugger processes that enables debugging of the failure type.

6. The method of claim 5, wherein selecting the checkpoint and corresponding state information and specific code execution point further comprises: in response to receiving the notification, identifying which second machine is physically pre-configured as a mirrored second machine of the first machine; accessing the pre-established storage location; and selecting a correct state information from the pre-established storage to utilize in configuring the mirrored second machine to operate similarly to the first machine from the identified checkpoint in the computer code to yield a similar failure as occurred on the first machine.

7. The method of claim 2, wherein the first virtual machine and the second virtual machine are one of: collocated on a same physical device with a single hypervisor; and located on separate host devices connected via a communication interconnect from among a direct interconnect and a network.

8. A computer-implemented method of debugging computer code executing on a first machine, the method comprising:

receiving a notification indicating that execution of the computer code on the first machine has failed;

in response to receiving the notification:

obtaining state information corresponding to a previous operating state of the first machine at a checkpoint performed during the execution of the computer code on the first machine prior to a failure of the computer code execution;

configuring, with the state information obtained, a second machine having a same physical configuration to a same operating state as the previous operating state of the first machine at the checkpoint, wherein the second machine is a mirrored version of the first machine relative to execution of the computer code;

triggering a processor of the second machine to initiate execution of a copy of the computer code on the second machine from a specific code execution point at which the checkpoint was initiated on the first machine;

activating a debugger module to run concurrently with the execution of the copy of the computer code on the second machine and collect debug data corresponding to execution of the computer code on the second machine from the checkpoint up to the failure of the computer code execution on the second machine; and storing the debug data as debug data corresponding to execution failure of the computer code on the first machine.

9. The method of claim 8, wherein:

the first machine and the second machine are a first virtual machine and a second virtual machine, each respectively configured and maintained by a hypervisor and each having an identical provisioning of an amount and type of processor, memory and other resources to enable the first virtual machine and the second virtual machine to respectively perform an identical execution of the computer code and of the copy of the computer code;

the computer code executes in the first virtual machine with no concurrent execution of a debugger to enable more efficient execution of the computer code and to reduce an amount of processor and other resources utilized while running the computer code on the first machine; and the copy of the computer code is executed concurrently with the debugger module on the second machine from only the specific code execution point at which the checkpoint was initiated and only in response to detection of the execution failure of the computer code at the first machine.

10. The method of claim 8, wherein obtaining the state information corresponding to a previously initiated checkpoint comprises:

accessing a pre-established storage location at which the state information is stored during the checkpoint on the first machine, wherein the state information is stored at the pre-established storage location by a checkpoint module performing the checkpoint on the first machine, wherein the checkpoint module completes the processes of:

suspending execution of the computer code in the first machine;

capturing current state information of the first machine, including the specific point of execution in the computer code;

storing the state information at the pre-established storage location that is accessible to the second machine; and resuming execution of the computer code on the first machine in response to successful completion of the storing of the state information.

11. The method of claim 8, further comprising:

parsing the notification for an indication of a failure type from among one or more pre-established failure types having associated failure characteristics and debug requirements;

selecting, based on the failure type indicated within the notification, the state information corresponding to a selected checkpoint from among a plurality of previous checkpoints performed at different times on the first machine, with each of the plurality of previous checkpoints having a different set of state information and a different specific code execution point, wherein the selected checkpoint enables complete debugging of the failure type; and running the debugger module from the selected checkpoint with one or more available debugger processes that enables debugging of the failure type.

* * * * *